(12) United States Patent
Sasin et al.

(10) Patent No.: US 10,321,311 B2
(45) Date of Patent: Jun. 11, 2019

(54) BOOTSTRAP MECHANISM FOR ENDPOINT DEVICES

(71) Applicant: ARM Limited, Cambridge (GB)

(72) Inventors: Szymon Sasin, Oulu (FI); Norbert David, Oulu (FI)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 14/842,065

(22) Filed: Sep. 1, 2015

(65) Prior Publication Data

US 2016/0065556 A1 Mar. 3, 2016

(30) Foreign Application Priority Data

Sep. 3, 2014 (GB) .................................. 1415562.6

(51) Int. Cl.
| | | |
|---|---|---|
| G06F 7/04 | (2006.01) | |
| G06F 15/16 | (2006.01) | |
| G06F 17/30 | (2006.01) | |
| H04L 29/06 | (2006.01) | |
| H04W 12/06 | (2009.01) | |

(Continued)

(52) U.S. Cl.
CPC ......... *H04W 12/06* (2013.01); *H04L 63/0823* (2013.01); *H04L 67/2838* (2013.01); *H04W 4/50* (2018.02); *H04W 4/60* (2018.02); *H04W 4/70* (2018.02); *H04L 67/34* (2013.01); *H04W 4/80* (2018.02); *Y02D 70/00* (2018.01);

(Continued)

(58) Field of Classification Search
CPC .... G06F 9/4416; G06F 9/445; G06F 9/44505; G06F 9/4451; G06F 21/305; H04W 4/001; H04W 4/005; H04L 67/34; H04L 67/32; H04L 67/10; H04L 67/16
See application file for complete search history.

(56) References Cited

U.S. PATENT DOCUMENTS

| | | | | |
|---|---|---|---|---|
| 5,349,643 A | * | 9/1994 | Cox ....................... | G06F 9/4416 713/155 |
| 5,872,968 A | * | 2/1999 | Knox ..................... | G06F 9/4416 709/222 |

(Continued)

FOREIGN PATENT DOCUMENTS

| | | | | |
|---|---|---|---|---|
| EP | 2466791 A1 | * | 6/2012 | ............ H04W 4/70 |
| GB | 2533385 A | | 6/2016 | |

(Continued)

OTHER PUBLICATIONS

Search Report dated Jan. 12, 2015 for GB Application No. 1415562.6, 5 pages.

(Continued)

*Primary Examiner* — Trong H Nguyen

(74) *Attorney, Agent, or Firm* — Patterson Thuente Pedersen, P.A.

(57) ABSTRACT

A method of bootstrapping between endpoint client and server in a low power wireless network. The method includes the steps of initiating a bootstrap request from an endpoint client to the server with the bootstrap request including an endpoint client name in an identifier, determining a registry apparatus to be assigned to the endpoint client, accepting the bootstrap request at the server and in response to the bootstrap request providing a security object and an identifier to the endpoint client to identify the assigned registry apparatus.

11 Claims, 8 Drawing Sheets

(51) Int. Cl.
  *H04L 29/08* (2006.01)
  *H04W 4/50* (2018.01)
  *H04W 4/60* (2018.01)
  *H04W 4/70* (2018.01)
  *H04W 4/80* (2018.01)

(52) U.S. Cl.
  CPC .......... *Y02D 70/144* (2018.01); *Y02D 70/166* (2018.01); *Y02D 70/21* (2018.01)

(56) References Cited

U.S. PATENT DOCUMENTS

| | | | | |
|---|---|---|---|---|
| 6,463,535 | B1* | 10/2002 | Drews | G06F 9/4416 713/176 |
| 6,950,660 | B1 | 9/2005 | Hsu et al. | |
| 7,363,514 | B1* | 4/2008 | Behren | G06F 9/4416 713/100 |
| 7,882,345 | B1* | 2/2011 | Christensen | G06F 9/4416 709/217 |
| 7,971,045 | B1* | 6/2011 | Currid | G06F 9/4408 709/226 |
| 8,370,491 | B1 | 2/2013 | Breau et al. | |
| 9,064,117 | B1* | 6/2015 | Worsley | G06F 11/1415 |
| 2005/0010758 | A1 | 1/2005 | Landrock et al. | |
| 2006/0075242 | A1 | 4/2006 | Aissi et al. | |
| 2007/0220266 | A1 | 9/2007 | Cooper et al. | |
| 2009/0129597 | A1* | 5/2009 | Zimmer | G06F 21/575 380/277 |
| 2009/0276620 | A1* | 11/2009 | McCarron | H04L 9/3271 713/155 |
| 2012/0079031 | A1 | 3/2012 | Matthews et al. | |
| 2013/0160094 | A1 | 6/2013 | Luo | |
| 2014/0089652 | A1* | 3/2014 | Cerri | G06F 9/4411 713/2 |
| 2014/0330952 | A1 | 11/2014 | Starsinic et al. | |
| 2015/0071139 | A1 | 3/2015 | Nix | |
| 2015/0296470 | A1* | 10/2015 | Kim | H04W 4/70 455/435.2 |
| 2015/0305008 | A1* | 10/2015 | Kim | H04W 72/0406 370/329 |
| 2015/0358824 | A1* | 12/2015 | Kim | H04W 4/70 726/4 |
| 2016/0072808 | A1 | 3/2016 | David et al. | |
| 2017/0039373 | A1 | 2/2017 | Sasin et al. | |
| 2017/0041287 | A1 | 2/2017 | Pak et al. | |

FOREIGN PATENT DOCUMENTS

| | | | |
|---|---|---|---|
| KR | 20140113007 A | 9/2014 | |
| WO | WO 2006/059195 A1 | 6/2006 | |
| WO | WO 2009/141493 A1 | 11/2009 | |
| WO | WO 2014/048236 A1 | 3/2014 | |
| WO | WO 2014/069968 A1 | 5/2014 | |
| WO | WO-2014114354 A1 * | 7/2014 | ............. H04W 4/70 |
| WO | WO 2014/182674 A1 | 11/2014 | |
| WO | WO 2014/190177 A1 | 11/2014 | |
| WO | WO 2015/042370 A1 | 3/2015 | |
| WO | WO 2015/065913 A1 | 5/2015 | |

OTHER PUBLICATIONS

"Lightweight M2M": Enabling Device Management and Applications for the Internet of Things, Feb. 26, 2014, Vodafone, Arm and Ericsson, 16 pages.

Search Report dated Mar. 17, 2016 for GB Application No. GB1513750.8, 6 pages.

Examination Report dated Nov. 10, 2017 for Application No. GB1513750.8, 3 pages.

Application and File history for U.S. Appl. No. 15/218,902, filed Jul. 25, 2016. Inventors: Pak et al.

Application and File history for U.S. Appl. No. 15/226,523, filed Aug. 2, 2016. Inventors: Sasin et al.

"Public Key Infrastructures and Digital Certificates for the Internet of Things", Schukat et al, 26th Irish Signals and Systems Conference (ISSC), pp. 1-5, IEEE, Jun. 24-25, 2015.

"Security for IoT. An effective DTLS with public certificates", Panwar et al., 2015 International Conference on Advances in Computer Engineering and Applications (ICACEA), pp. 163-166, IEEE, Mar. 19-20, 2015.

Search Report dated Mar. 17, 2016 for GB Application No. 1513748.2, 7 pages.

Examination Report dated Jul. 12, 2018 for Application No. GB1806259.6, 6 pages.

* cited by examiner

BOOTSTRAP MECHANISM FOR ENDPOINT DEVICES

RELATED APPLICATION

The present application claims priority to GB Application No. 1415562.6 filed Sep. 3, 2014, which is hereby incorporated herein in its entirety by reference.

TECHNICAL FIELD

The present technique relates, in general, to a bootstrap mechanism for endpoint devices. More specifically, the bootstrap mechanism initiates a directory and semantic lookup of all machine to machine nodes and resources in a system to provide transparent proxy services between the large-resource traditional Internet and constrained-resource protocols.

BACKGROUND ART

The Internet of Things encompasses all embedded devices and networks that are natively IP-enabled and Internet-connected, along with the Internet services monitoring and controlling those devices. Such IP-enabled embedded devices connected to the internet are termed endpoints and include sensors, machines, active positioning tags, radio-frequency identification (RFID) readers and building automation equipment to name but a few.

Data exchange between programs, computers and Machine-to-Machine (M2M) is a vital element. Different programs, computers and processors are used in different environments. On the Internet, the Transmission Control Protocol/Internet Protocol (TCP/IP) is the basic protocol used in communication. TCP/IP takes care of assembling and disassembling the data to be transmitted in packets. IP handles the addressing so that packets are delivered to the correct destination and above TCP/IP, the Hypertext Transfer Protocol (HTTP) is used as a client/server protocol whereby a program may send an HTTP request to a server which responds with another HTTP message.

The Wireless Embedded Internet is a subset of the Internet of Things and is generally represented by resource-limited embedded devices, often battery powered and connected by low-power, low-bandwidth wireless networks to the Internet.

Current web service technologies have high power and large bandwidth demands neither of which are compatible with low-power networks. Recently, binary web service protocols have been developed for low-power wireless networks. A binary web service solution includes the use of a suitable web service protocol (such as simplified HTTP or a binary web service protocol such as Constrained Application Protocol CoAP) and an efficient content encoding (such as Efficient XML Interchange EXI, Binary XML or Fast Infoset FI).

An example of a network technology where Machine-to-Machine (M2M) communication is widely applied is a low-power wireless network, such as an IEEE 802.15.4 based embedded and sensor network. More recently, as M2M devices have become IP enabled, systems have become more open by using IP as a networking protocol.

Following the introduction of IEEE 802.15.4 other standards were developed to standardize an IP adaption for such wireless embedded links. For example, the IPv6 over Low Power Wireless Standard (6LoWPAN) is a set of standards which enable the efficient use of IPv6 over low-power, low-rate wireless networks on simple embedded devices through an adaption layer and the optimization of related protocols.

The Open Mobile Alliance Lightweight LWM2M is a new standard applicable to 6LoWPAN and is focussed on constrained cellular and M2M devices. A Lightweight Machine-to-Machine (LWM2M) Bootstrap process is used to provide mandatory information through the Bootstrap Interface for LWM2M Clients so that they can perform the registration with one or more LWM2M Servers. After the bootstrap sequence, the Clients have an LWM2M Server Account and optionally some other object instances, such as Access Control or Connectivity Object.

It is an object of the present technique is to provide additional features to the LWM2M Bootstrap process.

BRIEF DESCRIPTION OF DRAWINGS

Embodiments of the technique will now be described, by way of example only, and with reference to the accompanying drawings of which.

DESCRIPTION OF EMBODIMENTS

Figure 1:
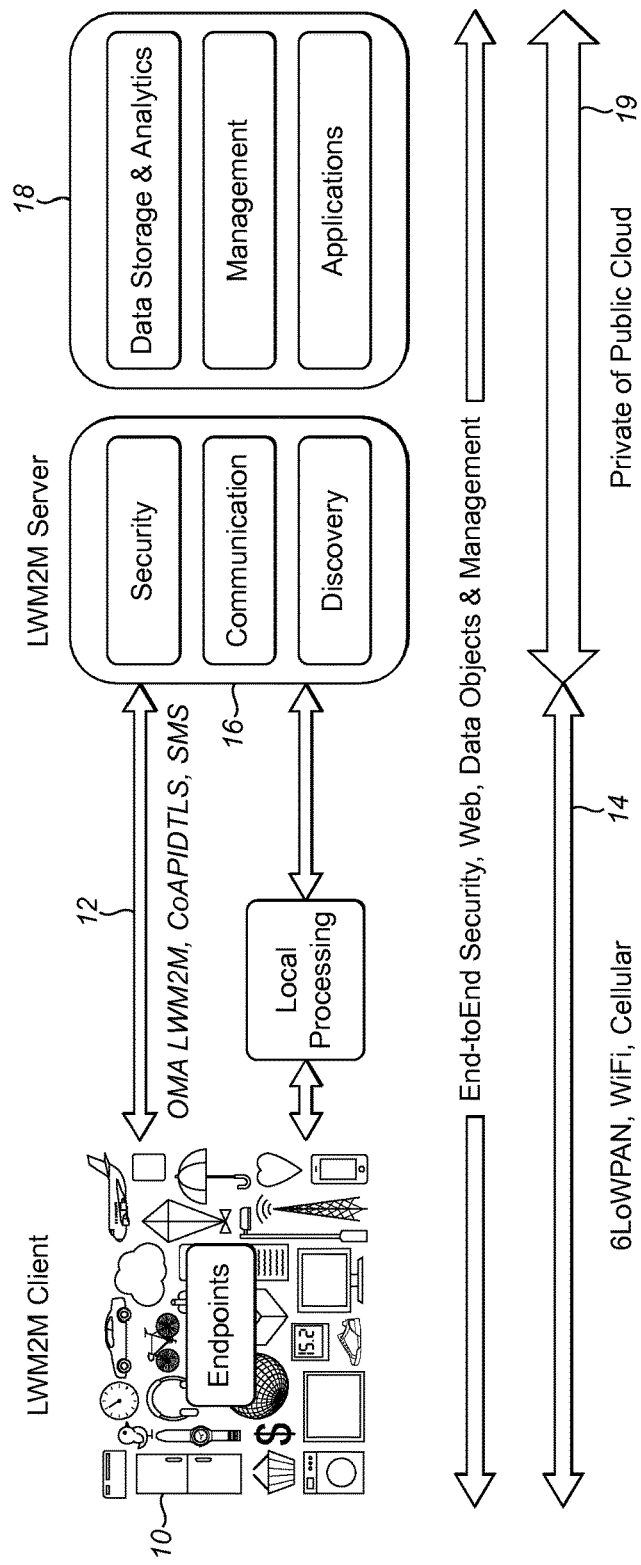
FIG. 1 is a schematic diagram of a LWM2M deployment scenario.

Therefore, referring to FIG. 1 a deployment scenario for an M2M endpoint device 10 is shown across a range of market segments from streetlights and electric meters to home and building automation. The endpoint devices 10 may interface 12 with a LWM2M server 16 based on open IETF standards such as Constrained Application Protocol (CoAP) over a low-power wireless network. One such low-power wireless network is an IEEE 802.15.4 based embedded and sensor network using IPv6 over Low Power Wireless Standard (6LoWPAN) 14. The LWM2M server 16 can interface with the wider world-wide web network 18 enabling deployment of M2M applications from a private server, private cloud or public cloud environment 19.

Figure 2:
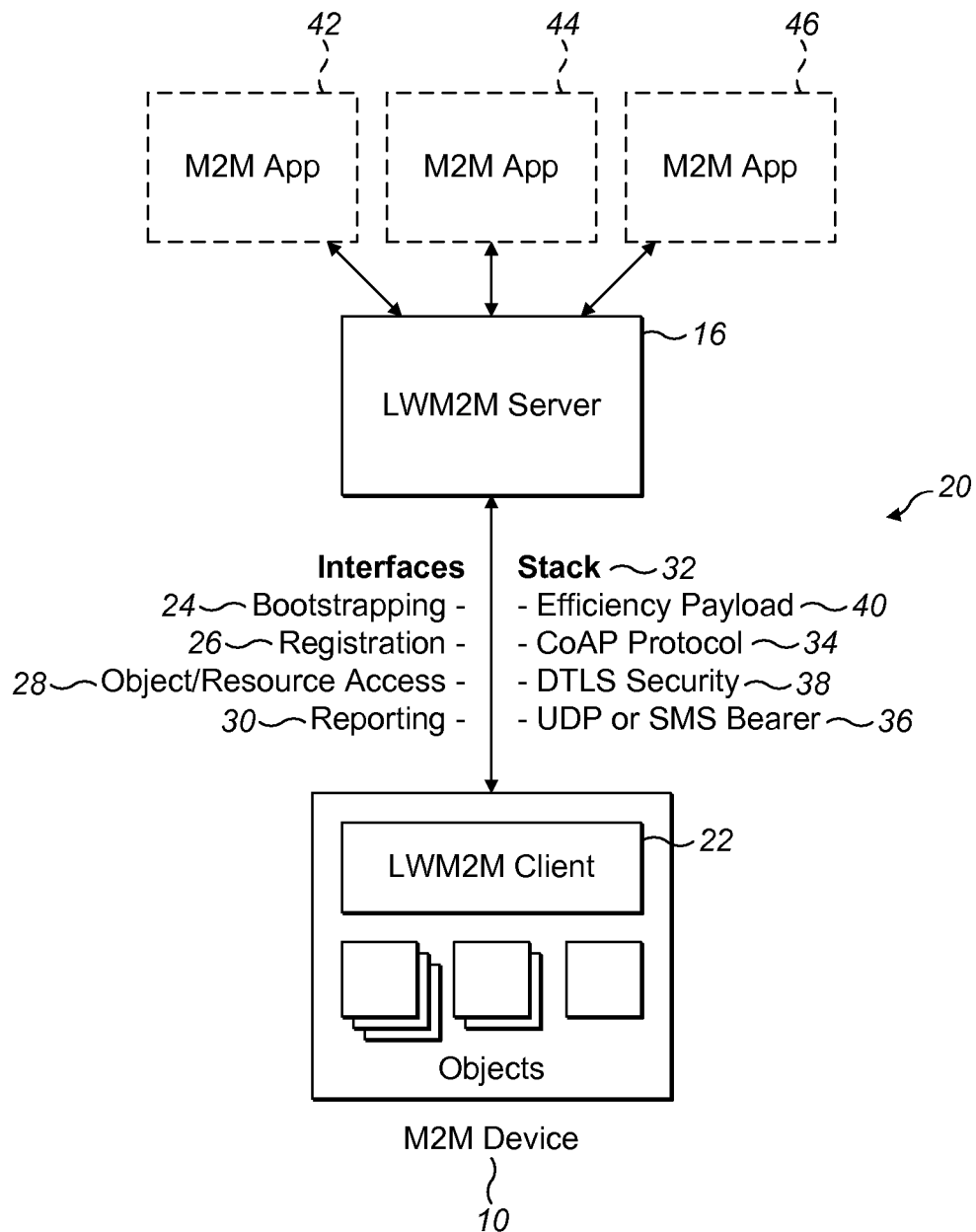
FIG. 2 is a schematic diagram of a LWM2M architecture with Server and Client.
Figure 3:
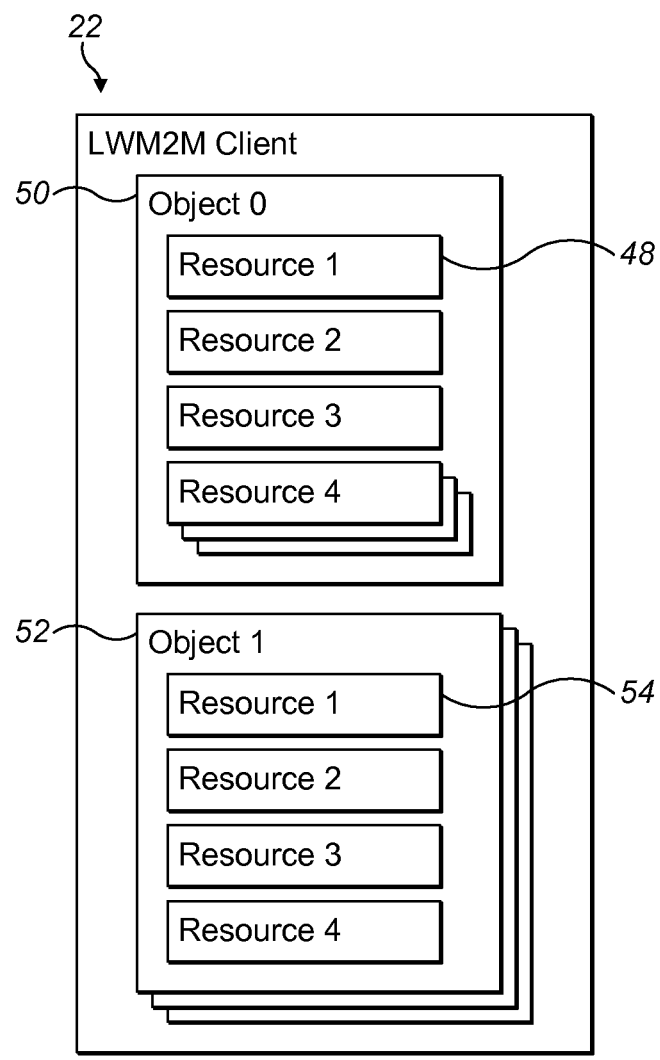
FIG. 3 is a schematic diagram of a LWM2M object model.

FIGS. 2 and 3 show the LWM2M architecture 20 which technically defines the application layer communication protocol for use between a client 22 on the M2M endpoint device 10 and server software on a LWM2M server 16. The client 22 resides on the device 10 and is integrated as a software library or a built-in function of a module or device 10. The server 16 is located in a private or public data center and can be hosted by the M2M Service Provider, Network Service Provider or Application Service Provider. Four logical interfaces are defined between the server and client, namely bootstrapping 24 being pre-provisioned or client/ server initiated; registration 26 to register the client 22 and its objects 50; object/resource access or device management 28 to enable server 16 access to an Object 50 or resource 48; and information reporting 30 for notifications with new Resource 48 values.

The LWM2M protocol stack 32 uses the Constrained Application Protocol (CoAP) 34 as the underlying transfer protocol over User Datagram Protocol (UDP) and Short Message Server (SMS) bearers 36. The CoAP protocol 34 defines the message header, request/response codes, message options and retransmission mechanisms. The CoAP protocol 34 is an alternative to HTTP for Representational State Transfer (RESTful) Application Programming Interfaces (APIs) on resource-constrained devices 10 and supports the methods of GET, POST, PUT, DELETE, which can be mapped to those of HTTP. Unlike HTTP, CoAP messages are exchanged asynchronously between CoAP end-points over a datagram-oriented transport such as UDP. CoAP messages are encoded in a binary format allowing functionality to start with a 4-byte overhead. LWM2M defines the UDP Binding with CoAP as mandatory whereas the SMS Binding with CoAP is optional, which in effect means that LWM2M client 22 to server 16 interaction may occur both via SMS and UDP 36.

The LWM2M architecture 20 use security protocols to secure communications between client 22 and server 16 using a Datagram Transport Layer Security (DTLS) 38. DTLS 38 is used to provide a secure channel between the LWM2M server 16 and the LWM2M client 22 for all efficient payloads 40. The efficient payloads 40 can be plain text for individual resources and Binary TLV or JSON for resource batches (Object or Resource Arrays). DTLS 38 security modes include both pre-shared key and public key technology to support embedded devices 10.

M2M application 42 developers can manage the devices 10 remotely through a M2M web application 44 and a M2M device management application 46.

Referring to FIG. 3, the client 22 illustrated in FIG. 2 is shown in more detail. Each piece of information made available by the LWM2M client 22 is a Resource 48. A Resource 48 is a piece of information that can be read, written or executed and is accessed with URIs:

/{Object ID}/{Object Instance]/[Resource ID}, for example /3/0/1 (Device Object, Manufacturer Resource).

The Resources 48 are further logically organized into Objects 50. Each LWM2M client 22 can have any number of Resources 48, each of which belongs to an Object 50. For example, a Firmware Object 52 may contain all the Resources 54 used for firmware update purposes.

Although not shown in FIG. 3, a set of objects for device management purposes include:

Security object to handle security aspects between management servers 16 and the client 22 on the device 10;
Server object to define data and functions related to the management server 16;
Access control object to define for each of several permitted management servers 16 the access rights the servers 16 have for each data object on the client 22;
Device object to detail resources on the M2M device 10 related to device 10 specific information;
Location object to group those resources that provide information about the current location of the M2M device 10;
Connectivity object to group together resources on the M2M device 10 that assist in monitoring the status of a network connection; and
Connection statistics object to group together resources on the M2M device 10 that hold statistical information about an existing network connection.

As an example, the device object allows remote retrieval of device information such as manufacturer, model, power information, free memory and error information. Furthermore the device object provides a resource for initiation of a remote reboot or factory reset.

As discussed in more detail with reference to FIGS. 4(*a*) and 4(*b*) to 7, the LWM2M standard defines a provisioning and bootstrapping 24 functionality that allows the server 16 to manage the keying, access control and configuration of the device 10 to enroll with the server 16. The LWM2M Bootstrap server is used to provide information through the Bootstrap Interface 24 for client 22 so that the client 22 can perform its registration with one or more servers 16. After the bootstrap sequence, the client 22 has a server account and optionally some other object instances such as Access Control or Connectivity Object.

Bootstrapping for complete provisioning and key management may be pre-configured bootstrapping such as from Flash; smart card bootstrapping such as from a SIM card or use of a bootstrap server for initial setup or re-configuration and keying in the modes client-initiated bootstrapping and server-initiated bootstrapping.

Figure 4A:
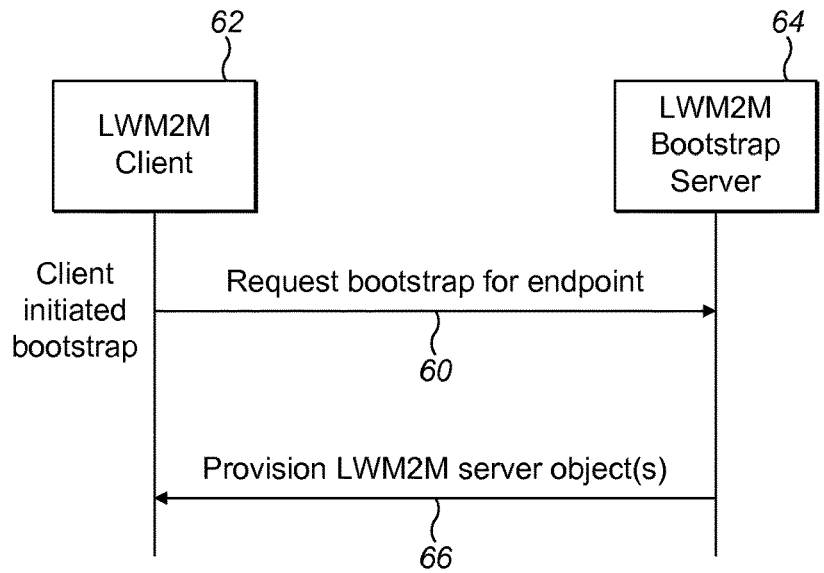
FIG. 4(a) is a schematic diagram of a client initiated bootstrap.
Figure 4B:
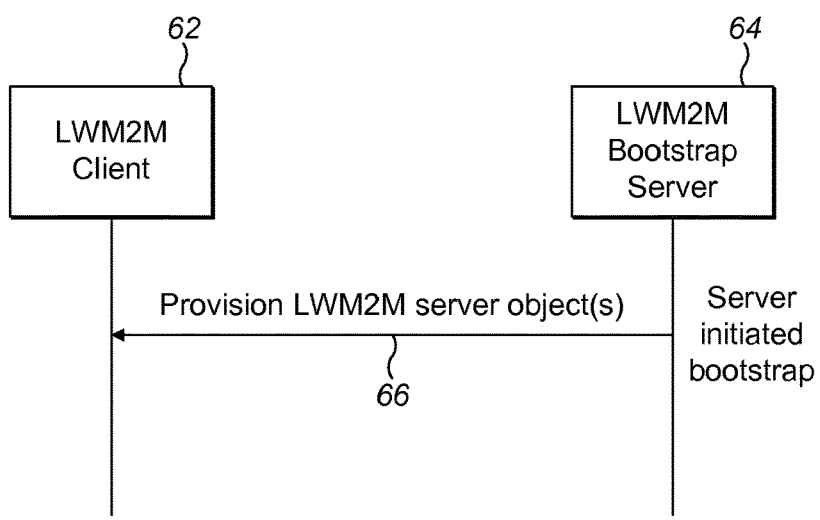
FIG. 4(b) is a schematic diagram of a server initiated bootstrap.

In its most simplified form as shown in FIG. 4(*a*) a client initiated bootstrap comprises a request for bootstrap for an endpoint device step 60 from a LWM2M client 62. In response, a LWM2M bootstrap server 64 provides a provision of LWM2M server objects 66 to the LWM2M client 62.

Referring to FIG. 4(*b*) a server initiated bootstrap comprises a provision of LWM2M server objects 66 only from LWM2M bootstrap server 64 to LWM2M client 62.

Figure 5:
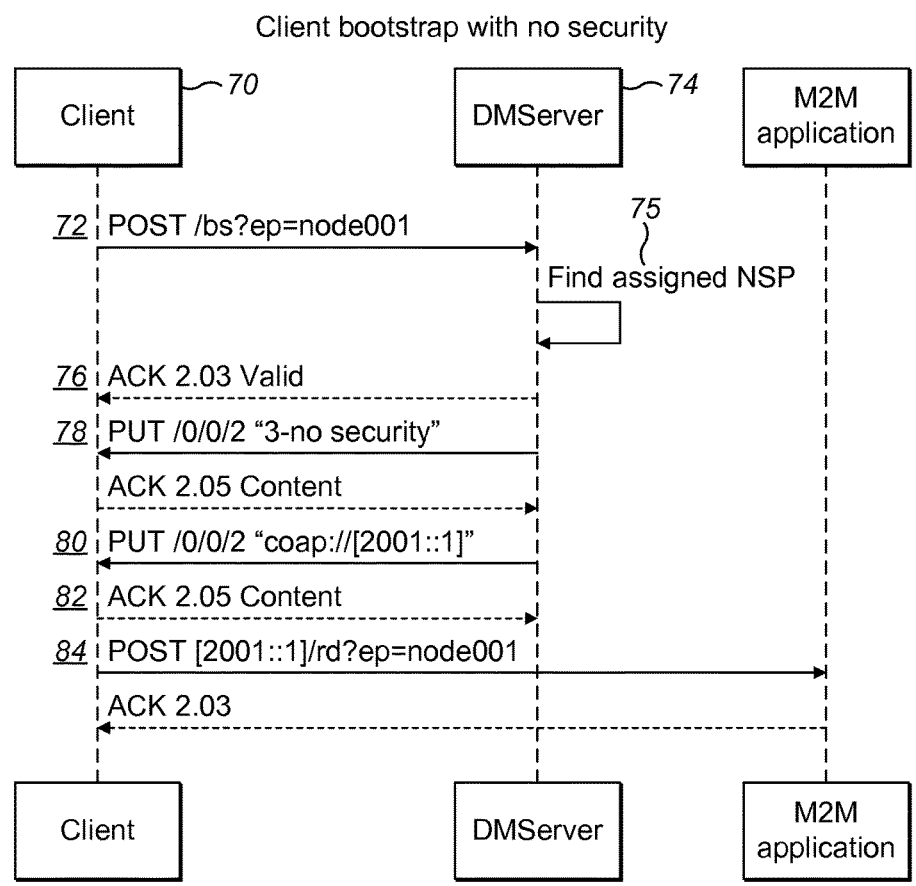
FIG. 5 is schematic diagram of a client bootstrap with no security according to a first embodiment.

FIG. 5 is a schematic diagram of a client bootstrap with no security according to a first embodiment. A client 70 initiated bootstrap in No Security mode is started when the client 70 sends a bootstrap request such as a CoAP POST request 72 to the LWM2M Bootstrap Server 74. The request 72 includes an endpoint client name as a query search parameter, which in this case is node001. The bootstrap server 74 finds an assigned registry apparatus such as a central application providing apparatus 75 which provides a directory and semantic lookup of all M2M nodes and resources in the system, provides transparent proxy services between the large-resource traditional Internet and constrained-resource protocols. The solution provides an end-to-end RESTful solution including support for standards such as CoAP, DTLS, HTTP, TLS and OMA Lightweight M2M.

The Bootstrap Server 74 accepts the request by responding Acknowledge 2.03 (Valid) 76 and performs WRITE operations to PUT the following information to the client:

Security mode 78 which is "3-no security" in this case
M2M application URL 80 enabling deployment of M2M applications from a private server, private cloud or public cloud environment.

The client 70 acknowledges all operations by responding an ACK 2.05 (Content) 82 and after a successful bootstrap process, the Client 70 can register 84 with the appropriate assigned registry apparatus 75.

Figure 6:
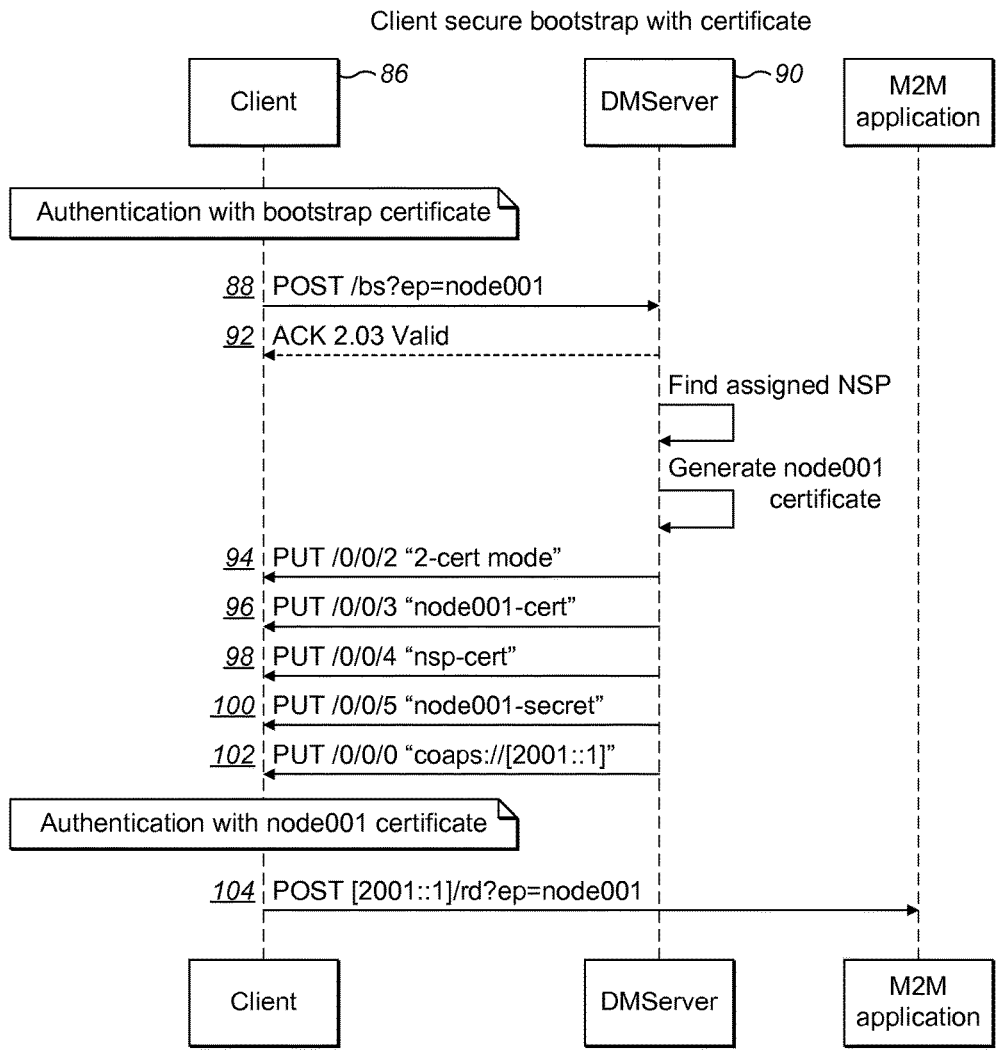
FIG. 6 is a schematic diagram of a client secure bootstrap with certificate according to a second embodiment.

FIG. 6 is a schematic diagram of a client secure bootstrap with certificate according to a second embodiment. A client 86 initiated bootstrap in certificate mode is started when the client 86 sends a bootstrap request such as a CoAP POST request 88 to the LWM2M Bootstrap server 90. The request 88 includes the Endpoint Client Name as a query string parameter.

The Bootstrap server 90 accepts the request by responding Acknowledge 2.03 (Valid) 92 and performs WRITE operations to PUT the following information to the client 86.

Security mode 94 which is "2-certificate mode" in this case;

A client certificate 96 generated during the bootstrap process;

A registry certificate 98 used by the client 86 to identify the registry apparatus;

A private key 100 for the client certificate; and

M2M application URL 102 enabling deployment of M2M applications from a private server, private cloud or public cloud environment.

The client 86 acknowledged all operations by Responding an ACK 2.05 (Content) (not shown in FIG. 6) and after a successful bootstrap process, the client 86 can register 104 with an appropriate registry apparatus.

Figure 7:
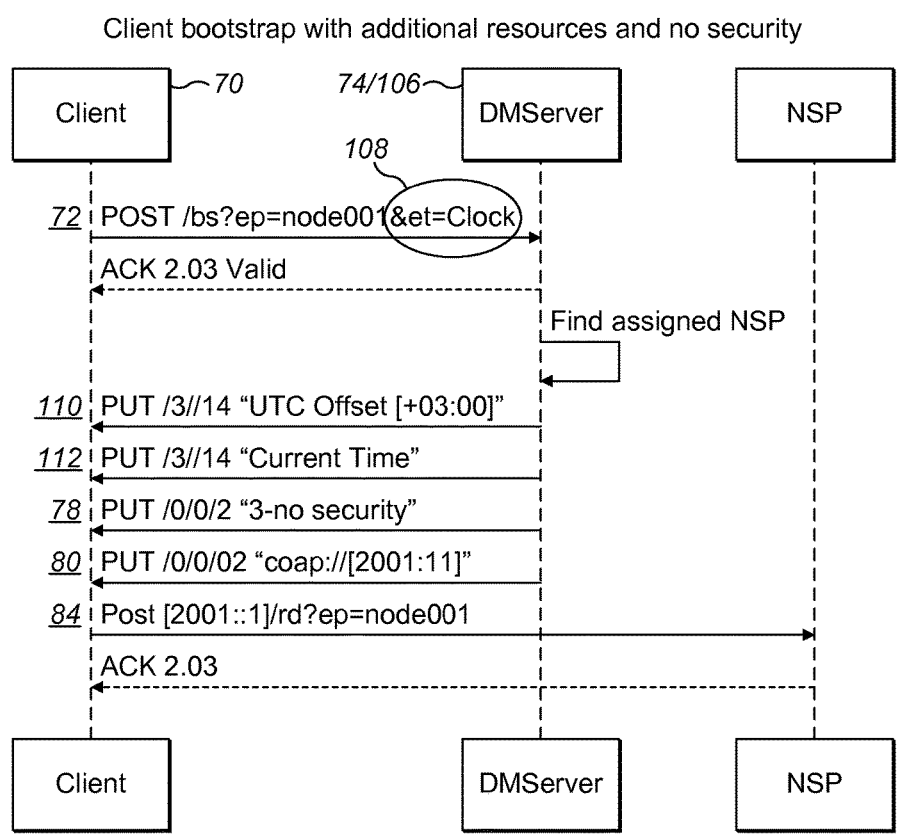
FIG. 7 is a schematic diagram of a client bootstrap with additional resources with no security according to a third embodiment.

FIG. 7 is a schematic diagram of a client bootstrap with additional resources with no security according to a third embodiment. According to a third embodiment, a device management server supports configuring of optional resources in addition to standard bootstrap parameters. An administrator can configure an endpoint-type specific list of resources to be set during the bootstrap process. Those resources are set before the standard parameters in order to ensure that they are already available for the Client at the time when it starts the registration process. The following examples with reference to FIG. 7 demonstrate the cases when the Client's clock is set during bootstrap with the proper timezone and current time. The Client requests the bootstrap information with an additional parameter of endpoint-type.

Referring to FIG. 7, where like reference numerals are used to denote like parts in FIG. 5, a client 70 initiated bootstrap in No Security mode is started when the client 70 sends a bootstrap request such as a CoAP POST request 72 to the LWM2M Bootstrap Server 74. The request 72 includes an endpoint client name as a query search parameter, which in this case is node001 along with an additional parameter of endpoint type (et=Clock) 108.

The Bootstrap Server 74 accepts the request by responding Acknowledge 2.03 (Valid) 76 and performs WRITE operations to PUT the following information to the client:

The first information is Universal Time Offset 110, in this example+3 hours. The second information is the current time 112.

Other information then put to the client 70 after the additional information is put to the client 70 includes:

Security mode 78 which is "3-no security" in this case

M2M application URL 80 enabling deployment of M2M applications from a private server, private cloud or public cloud environment.

After a successful bootstrap process, the Client can register 84 with the appropriate registry apparatus.

Figure 8:
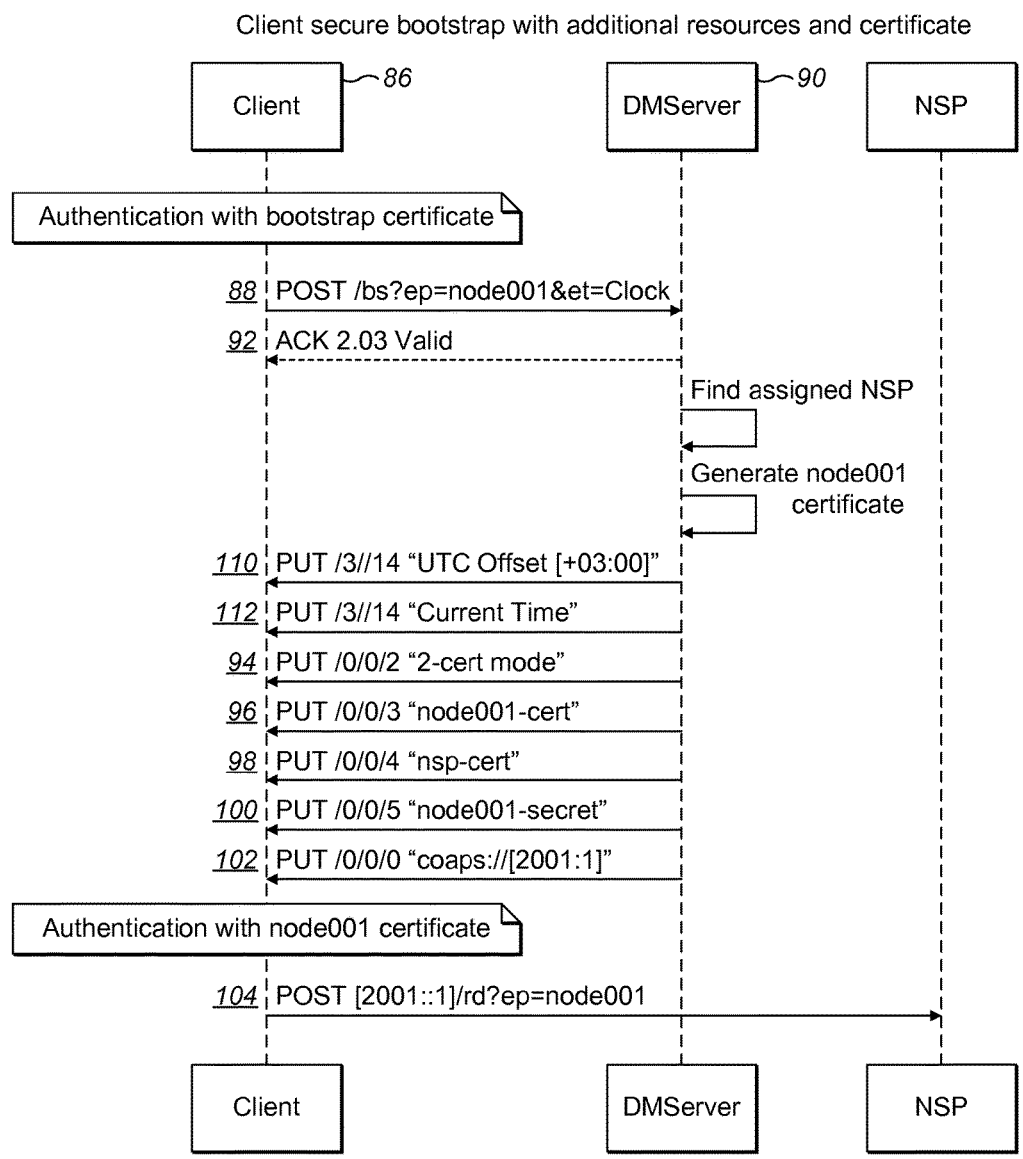
FIG. 8 is a schematic diagram of a client secure bootstrap with additional resource with certificate according to a fourth embodiment.

FIG. 8 is a schematic diagram of a client secure bootstrap with additional resource with certificate according to a fourth embodiment. According to a fourth embodiment, a device management server supports configuring of optional resources in addition to standard bootstrap parameters. An administrator can configure an endpoint-type specific list of resources to be set during the bootstrap process. Those resources are set before the standard parameters in order to ensure that they are already available for the Client at the time when it starts the registration process. The following examples with reference to FIG. 8 demonstrate the cases when the Client's clock is set during bootstrap with the proper timezone and current time. The Client requests the bootstrap information with an additional parameter of endpoint-type.

Referring to FIG. 8, where like reference numerals are used to denote like parts in FIG. 6 a client 86 initiated bootstrap in certificate mode is started when the client 86 sends a bootstrap request such as a CoAP POST request 88 to the LWM2M Bootstrap server 90. The request 88 includes the Endpoint Client Name as a query string parameter along with an additional parameter of endpoint type (et=Clock) 108.

The Bootstrap server 90 accepts the request by responding Acknowledge 2.03 (Valid) 92 and performs WRITE operations to PUT the following information to the client 86:

The first information is Universal Time Offset 110, in this example +3 hours. The second information is the current time 112.

Other information then put to the client 86 after the additional information is put to the client 86 includes Security mode 94 which is "2-certificate mode" in this case;

A client certificate 96 generated during the bootstrap process;

A registry certificate 98 used by the client 86 to identify the registry apparatus;

A private key 100 for the client certificate; and

M2M application URL 102 enabling deployment of M2M applications from a private server, private cloud or public cloud environment.

The client 86 acknowledges all operations by responding an ACK 2.05 (Content) (not shown in FIG. 8) and after a successful bootstrap process, the client 86 can register 104 with an appropriate registry apparatus.

Additional embodiments of the technique are envisaged within the scope of the above specific description. For example, more information may be sent from the client to the server during bootstrapping depending upon the application. As an example, a list of endpoint types may include "sensor", "switch" or "light" where a sensor may need to know who is interested in the detected information and when and for how long the sensor should operate. The additional information request may be an identifier sent as metadata from the client to the server. In response the server pushes bootstrap information back to the client and some of the bootstrap information is provided as a direct result of the additional information. The endpoint type can be sent as an Endpoint Client Name identifier in the form of a string uniquely identifying the LWM2M Client on one LWM2M Server and is provided to the server during registration. One example of an Endpoint Client Name is the International Mobile Station Equipment Identity (IMEI) number, the serial number or a logical name of the device.

In the case of an IMEI for example, the digits can uniquely identify the make and model of the endpoint device. The device management service may include a lookup table comprising a database of the parameters of the endpoint device allocated to make and models. The parameters of the endpoint device can include type and supported features such as clock and global positioning. The device management server can customize the bootstrap information sent by the server to the endpoint device based on the information contained in the endpoint name only.

In an alternative embodiment, the server may send back less information than required by the standard. This may occur if a user wants to reduce bandwidth. Such a reduction in information sent during bootstrapping compared to the standard can occur as a direct result of the additional information sent from the client to the server when initiating the bootstrapping process. Also, the server may send back less information based on a hardcoded agreement of the parameters found in the security method and/or certificate.

According to a first aspect, there is provided a method of bootstrapping between client and a server in a low power wireless network, the method comprising: initiating a bootstrap request from a client to the server with the bootstrap request including an endpoint client name in an identifier; determining a registry apparatus to be assigned to the endpoint client name; accepting the bootstrap request at the server and in response to the bootstrap request providing a security object and an identifier to the client to identify the assigned registry apparatus.

In some embodiments the method may include registering the client with the assigned registry apparatus.

In some embodiments the bootstrap request may comprise the endpoint client name and additional identifier. The additional identifier may initiate an endpoint-type specific list of resources to be provided to the client during the bootstrap process. In some embodiments according to the method of the first aspect of the present invention, the specific list of resources may be provided to the client before the step of providing a security object and/or an identifier to the client to identify the assigned registry apparatus.

In some embodiments the specific list of resources may be set after the step of the server finding an assigned registry or central application providing apparatus for the client.

In some embodiments the additional identifier may include a request for additional information to the client from the server or a request for less information to be sent to the client from the server.

In some embodiments the endpoint-type specific list of resources may be provided from server to client in sequence.

In some embodiments the additional identifier may be sent as metadata from the client to the server.

In a second aspect of the present technique, a hardware apparatus is provided for receiving a bootstrap request from an endpoint client, the hardware apparatus comprising an input for receiving a bootstrap request from an endpoint client with the bootstrap request including an endpoint client identifier; a processor block having logic gates to receive the bootstrap request and process the bootstrap request for determining from a registry block an assigned registry apparatus and security object for the endpoint client; communication circuitry configured, in response to the assigned registry apparatus and security object, to transmit to the endpoint client an identifier to identify the assigned registry apparatus and security object.

In some embodiments, the hardware apparatus is a networked device management server.

The invention claimed is:

1. A method of bootstrapping between a Lightweight Machine-to-Machine (LWM2M) endpoint client and a LWM2M server in a network, the method comprising:
   initiating a bootstrap request from the LWM2M endpoint client to the LWM2M server with the bootstrap request including an endpoint client identifier and at least one additional endpoint client parameter;
   determining at the LWM2M server a LWM2M registry apparatus to be assigned to the endpoint client;
   accepting the bootstrap request at the LWM2M server and in response to the bootstrap request providing a security object and an identifier to the LWM2M endpoint client to identify the assigned LWM2M registry apparatus, wherein the additional endpoint client parameter initiates an endpoint-type specific list of resources to be provided to the LWM2M endpoint client during a bootstrap process corresponding to the bootstrap request, wherein the endpoint-type specific list of resources is set after the step of determining the assigned LWM2M registry apparatus for the LWM2M endpoint client; and
   following a successful completion of the bootstrap process, registering the LWM2M endpoint client with the assigned LWM2M registry apparatus.

2. A method as claimed in claim 1, wherein the endpoint client identifier comprises an endpoint client name.

3. A method as claimed in claim 2, wherein the additional endpoint client parameter includes a request for additional information to be sent to the LWM2M endpoint client from the LWM2M server.

4. A method as claimed in claim 1, wherein the endpoint client identifier comprises an endpoint client name selected from an International Mobile Station Equipment Identity (IMEI), serial number or a logical name of the LWM2M endpoint client.

5. A method as claimed in claim 4, including providing a resource to the LWM2M endpoint client from the LWM2M server including a step of retrieving from a database a specific resource corresponding to the endpoint client identifier.

6. A method as claimed in claim 1, wherein the endpoint-type specific list of resources is provided from the LWM2M server to the LWM2M endpoint client in a sequence.

7. A method as claimed in claim 1, wherein the additional endpoint client parameter is sent as metadata from the LWM2M endpoint client to the LWM2M server.

8. A method of bootstrapping a Lightweight Machine-to-Machine (LWM2M) endpoint client from a LWM2M server in a network, the method comprising:
   receiving, at the LWM2M server, a bootstrap request from the LWM2M endpoint client with the bootstrap request including an endpoint client identifier and at least one additional endpoint client parameter;
   determining, at the LWM2M server, a LWM2M registry apparatus to be assigned to the LWM2M endpoint client;
   accepting the bootstrap request at the LWM2M server and in response to the bootstrap request providing a security object and an identifier to the LWM2M endpoint client to identify the assigned LWM2M registry apparatus, to allow the LWM2M endpoint client to register, following a successful completion of a bootstrap process corresponding to the bootstrap request, with the assigned LWM2M registry apparatus;
   wherein the additional endpoint client parameter initiates an endpoint-type specific list of resources to be provided to the LWM2M endpoint client during the bootstrap process, wherein the endpoint-type specific list of resources is provided to the LWM2M endpoint client before the step of providing the security object and the identifier to the LWM2M endpoint client to identify the assigned LWM2M registry apparatus.

9. A method of bootstrapping a Lightweight Machine-to-Machine (LWM2M)endpoint client in a network, the method comprising:
   initiating a bootstrap request from the LWM2M endpoint client to a LWM2M server with the bootstrap request including an endpoint client identifier and at least one additional endpoint client parameter;
   receiving from the LWM2M server and at the LWM2M endpoint client, in response to the bootstrap request, a security object and an identifier identifying an assigned LWM2M registry apparatus, the assigned LWM2M registry apparatus determined at the LWM2M server, wherein the additional endpoint client parameter initiates an endpoint-type specific list of resources to be provided to the LWM2M endpoint client during a bootstrap process corresponding to the bootstrap request, wherein the additional endpoint client parameter includes a request for less information to be sent to the LWM2M endpoint client from the LWM2M server; and following a successful completion of the bootstrap process, registering the LWM2M endpoint client with the assigned LWM2M registry apparatus.

10. A hardware apparatus for receiving a bootstrap request from a Lightweight Machine-to-Machine (LWM2M) endpoint client, the hardware apparatus comprising:

an input for receiving the bootstrap request from the LWM2M endpoint client with the bootstrap request including an endpoint client identifier and at least one additional endpoint client parameter;

a processor block having logic gates to receive the bootstrap request and process the bootstrap request for determining from a registry block an assigned LWM2M registry apparatus and a security object for the LWM2M endpoint client and for determining in response to the additional endpoint client parameter an endpoint-type specific list of resources to be provided to the LWM2M endpoint client during a bootstrap process corresponding to the bootstrap request;

communication circuitry configured, to transmit to the LWM2M endpoint client the endpoint-type specific list of resources during the bootstrap process and in response to the assigned LWM2M registry apparatus and the security object, to transmit to the LWM2M endpoint client an identifier to identify the assigned LWM2M registry apparatus and the security object, to allow the LWM2M endpoint client to register, following a successful completion of the bootstrap process, with the LWM2M assigned registry apparatus, wherein the endpoint-type specific list of resources is provided to the LWM2M endpoint client before the step of transmitting the security object and the identifier to the LWM2M endpoint client to identify the assigned LWM2M registry apparatus.

11. A hardware apparatus as claimed in claim 9, wherein the hardware apparatus is a networked device management server.

* * * * *

UNITED STATES PATENT AND TRADEMARK OFFICE
CERTIFICATE OF CORRECTION

PATENT NO. : 10,321,311 B2
APPLICATION NO. : 14/842065
DATED : June 11, 2019
INVENTOR(S) : Sasin et al.

Page 1 of 1

It is certified that error appears in the above-identified patent and that said Letters Patent is hereby corrected as shown below:

In the Claims

Claim 11, Column 10, Line 21:
After "claim" delete "9" and insert --10--.

Signed and Sealed this
Thirtieth Day of July, 2019

Andrei Iancu
*Director of the United States Patent and Trademark Office*